Feb. 6, 1962  R. C. TOPPER  3,019,720
OUTDOOR COOKING UNIT
Filed June 22, 1959  3 Sheets-Sheet 1
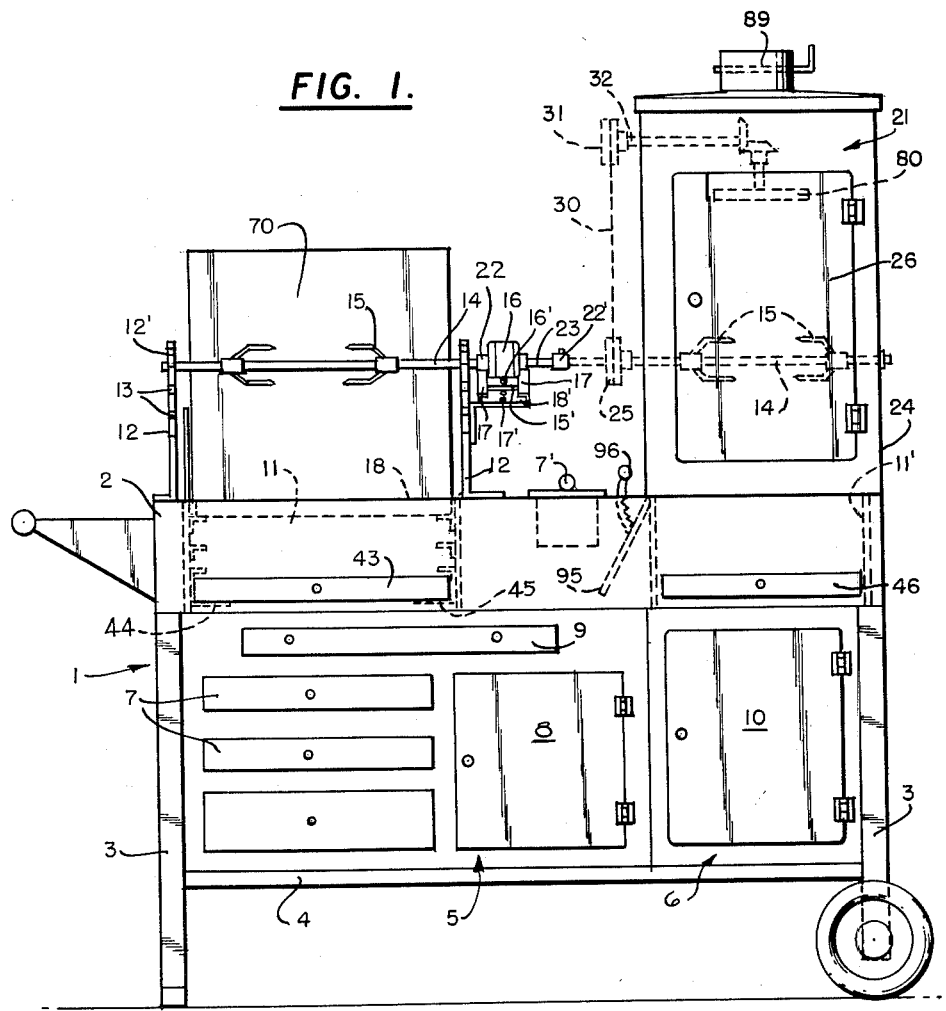
FIG. 1.
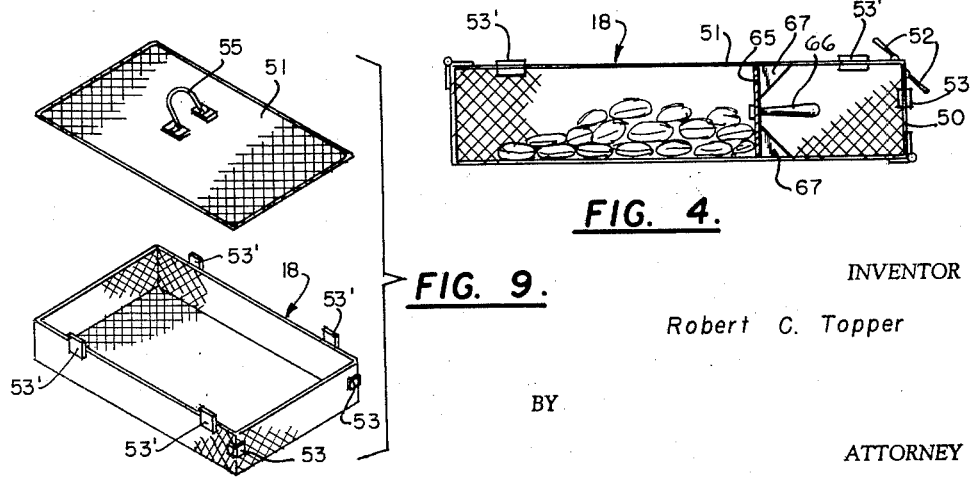
FIG. 4.
FIG. 9.
INVENTOR
Robert C. Topper
BY
ATTORNEY

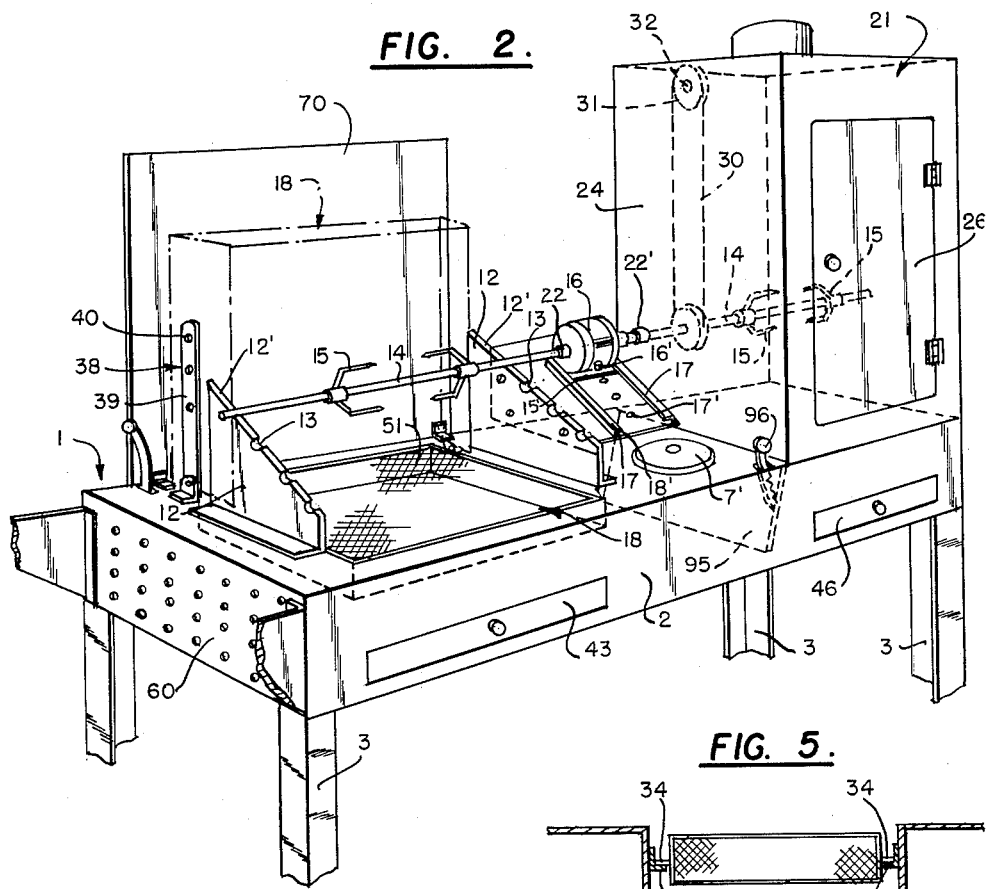
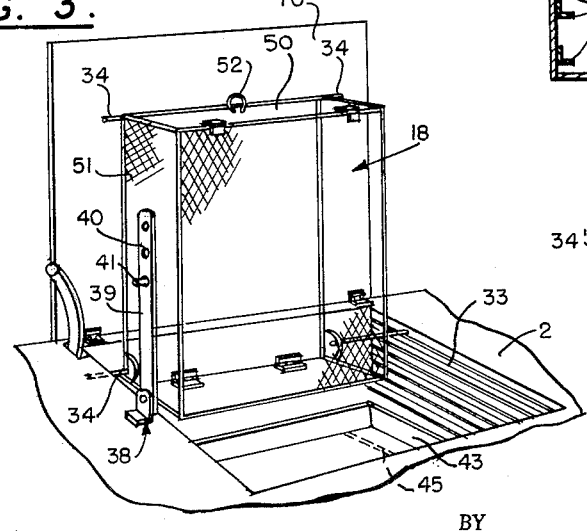
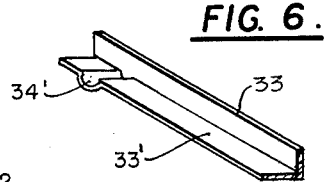

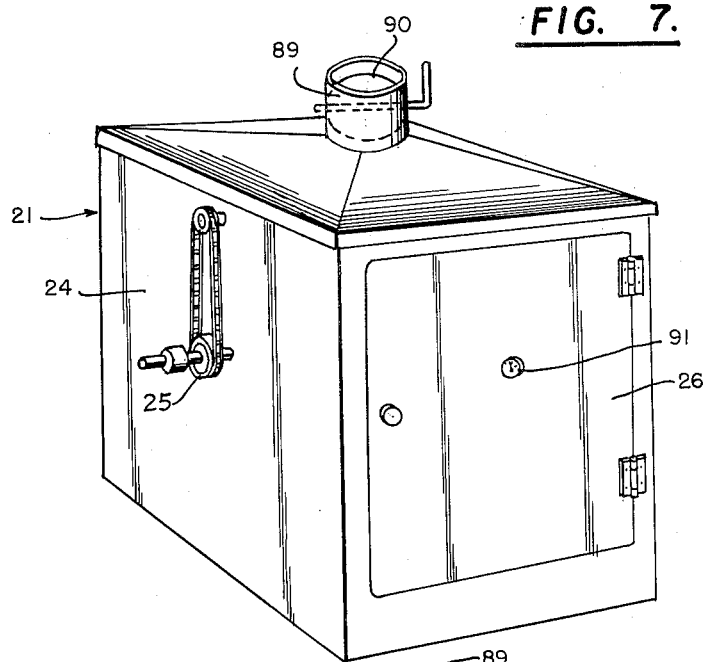
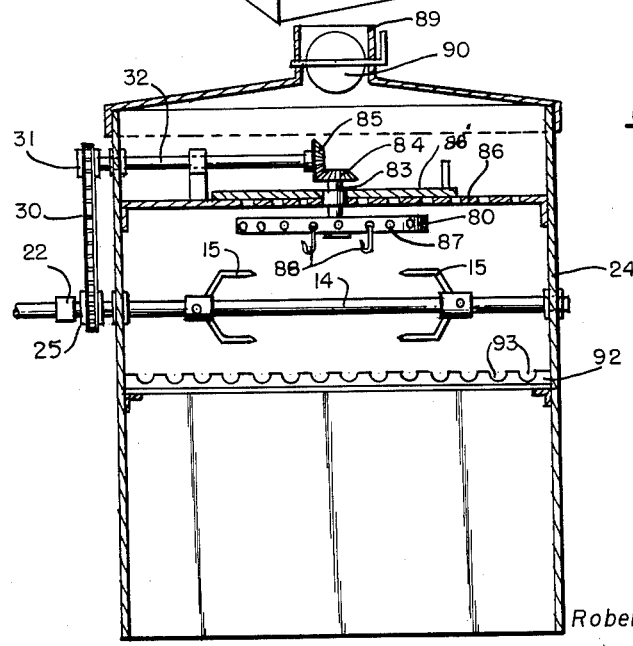

United States Patent Office
3,019,720
Patented Feb. 6, 1962

3,019,720
OUTDOOR COOKING UNIT
Robert C. Topper, 537 Brookhurst Drive, Dallas, Tex.
Filed June 22, 1959, Ser. No. 821,759
2 Claims. (Cl. 99—339)

This invention relates to outdoor barbecue ovens or cooking units. More particularly, it relates to a portable outdoor cooking unit provided with a uniquely mounted firebox and associated rotisserie assembly, both of which can be interchangeably used for cooking above a fire; cooking beside a fire; or for smoke cooking, the latter of which is commonly known as "Chinese Oven" cooking.

Accordingly, the objects of this invention are to provide an exceptionally versatile portable cooking unit having a uniquely mounted firebox, which can be interchangeably used for cooking in the three different ways set forth above; to provide a rotisserie assembly which may be used with the firebox in the three different cooking methods; to provide a uniquely mounted motor for rotating the rotisserie assembly regardless of the position of the assembly; and to provide a portable cooking unit which is of sturdy construction, cheap to manufacture and one that may be advantageously used with different accessories and can be readily cleaned.

Other objects and advantages of the instant invention will become more apparent from a review of the following detailed description, when taken in conjunction with the appended drawings wherein:

FIG. 1 is a front elevational view of the complete portable cooking unit of the instant invention;

FIG. 2 is a fragmentary perspective view with parts removed and other parts shown in dotted lines of the top portion of the cooking unit, and discloses in detail a unique arrangement for mounting the rotisserie assembly and a motor which rotates the same;

FIG. 3 is another fragmentary perspective view with parts removed of the top portion of the cooking unit and discloses in detail one arrangement for mounting the firebox on the cooking unit;

FIG. 4 is a sectional view taken through the firebox and discloses one arrangement for compacting the firebox so as to control the amount of fuel needed for any given cooking condition;

FIG. 5 is a partial sectional view of the bracket arrangement shown in FIG. 3 for mounting the firebox;

FIG. 6 is a partial perspective view of one of the mounting brackets shown in FIG. 5;

FIG. 7 is an overall perspective view of the Chinese Oven unit or portable cooking unit of the instant invention;

FIG. 8 is an elevational sectional view of the Chinese Oven unit shown in FIG. 7; and FIG. 9 is an exploded view of a modified type of firebox that may be used with the instant invention.

With further reference to the drawings and in particular FIG. 1, the portable cooking unit of the instant invention generally comprises a portable cart 1 made of sheet metal. The cart 1 has a housing 2 with a tablelike top surface and side and end walls supported by a plurality of depending legs 3. A lower shelf 4 is mounted or secured to legs 3 intermediate the bottom of the legs and top 2. If desired, a storage section 5 may be removably mounted on the shelf 4 at one side of the cart 1, and a fuel storage section 6 with an access door 10 removably mounted next to the storage unit. Both the storage and fuel sections may be sold as separate accessories for the cooking unit so that the purchaser need not buy them initially with cart 1 if he does not desire to do so. Suitable bolt means or the like are also employed for the purposes of securing sections 5 and 6 to the cart 1.

The storage section 5 is provided with a plurality of storage or food warming drawers 7, a large storage compartment having an access door 8 and a pull-out working surface 9. The compartment provided with access door 8 may be used for fuel storage in the event section 6 is not purchased and warming drawers 7 are used in addition to warming compartments 7' in top 2.

Suitably affixed to the top 2 of the cart 1, adjacent the firebox opening 11 therein, is a pair of spaced brackets 12. These brackets have inclined top surfaces 12' which are provided with a series of spaced slots or notches 13. Removably disposed within the notches 13 of the brackets 12 are portions of the rotisserie assembly rod or shaft 14 upon which is mounted the conventional skewers 15. It will be observed by particular reference to FIG. 2 that when a small electric motor 16 is used to drive the rotisseries shaft 14, motor 16 is adjustably mounted on one of the brackets 12 as described below.

The base 15' of the motor 16 is slidably disposed below and between the upper flanges of the spaced L-shaped elements 17 affixed to the inclined plate 17' secured to one side of a bracket 12. The elements 17 in effect form a slot 18' for receiving the base 15' of motor 16. A set screw 16' on the base 15' protrudes through the base 15'. When set screw 16' contacts one of several mating threaded openings in the surface of plate 17', the motor 16 may be selectively held in one of several positions along with shaft 14. In other words, as the rotisserie shaft 14 and skewers 15 are moved down or up along the top of brackets 12, the motor 16 will always be in a position to drive or rotate the rotisserie shaft 14. This is so that the meat can be cooked over the fire in the firebox 18 when the latter is disposed in opening 11 or beside the fire when the firebox 18 is pivoted to an upright position in a manner to be more fully described hereinafter and as shown in dotted lines in FIG. 2 and full lines in FIG. 3. It is to be understood, of course, that the spacing of the openings in plate 17' will correspond to the spacing of the notches 13 in the brackets 12.

An additional accessory that may be sold separately or with the cart 1 is a "Chinese Oven" unit or section 21 which is disclosed more fully in FIGS. 7 and 8. When "Chinese Oven" or smoke cooking is desired, the rotisseries shaft 14 is first disengaged from a conventional simplified coupling 22 affixed to motor shaft 23, removed from notches 13 in brackets 12 and then inserted in suitable openings in the walls 24 of the unit 21 and engaged with coupling 22'. Alternatively, provision can be made for simply turning the motor 16 around on plate 17' and re-engaging shaft 14 while it is in the "Chinese Oven" with the coupling 22. The skewers 15 in the meantime will have been disposed within the cabinet or "Chinese Oven" unit 21, to which access may be gained through the door 26.

Smoke for the "Chinese Oven" is also provided by the common firebox 18 in a mannner to be more fully disclosed hereinafter. It is also to be understood that section or unit 21 is mounted by suitable bolt or other means to the cart 1. This unit 21 is open at the bottom and is mounted over a suitable opening 11' in top 2 of cart 1. A thermometer 91 (FIG. 7) is provided in the door of the unit 21.

Adjustably disposed skewer support racks 92 (FIG. 8) having skewer supporting notches 93 may also be disposed in unit 21. The front rack would be detachable and the rear one permanently fixed.

Since the "Chinese Oven" unit 21 may be provided with a rotating rack 80 disposed at the top of the unit, some means must be provided for rotating the rack. This means advantageously includes a power take-off chain 30 and gear 31 secured to the main drive shaft 32 for the rack 80. A short shaft from 22' to just inside the opening in the side wall 24 is provided to carry gear 25 which protrudes over the top 2 of the cart and towards the motor 16. This gear is shown in dotted lines in FIGS. 1 and 2, and in full lines in FIGS. 7 and 8. By training the chain 30 about the gear 25, secured to shaft 14, motor 16 can then be used not only to drive the rotisserie shaft 14, but also the rotating rack 80 connected to shaft 32. Main drive shaft 32 is connected to the shaft 83 for rack 80 by means of bevel gears 84 and 85, shaft 83 being suitably journalled in the perforated partition 86 at the top of unit 21. The exposure of the openings of the partition may be regulated by means of the sliding plate 86'. Rack 80 which is a ring-like member affixed to shaft 83 by spider-like arms (not shown) may also have a plurality of hooks 88 suspended from openings 87 in the rack with the food to be cooked suspended from the hooks 88. A conventional flue 89 provided with an adjustable damper 90 is located at the top of the unit 21. It will also be obvious that other arrangements besides that described may be used to suspend rack 80 from the top of unit 21.

The uniquely mounted firebox 18 of the instant invention will now be described, reference being made particularly to FIG. 3. Firebox 18, the top, bottom and sides of which may comprise a heavy steel wire screen for containing the conventional charcoal fuel, has affixed to two opposing sides thereof, such as by welding, pivot shafts 34. Shafts 34 may also be continuations of certain of the wire members in the ends of the firebox 18. These pin members 34 are slidably disposed on the horizontal flanges 33' of a pair of angle supports 33. The flange 33' of the topmost support 33, as indicated in FIG. 6, is advantageously provided with a notch or recess 34' for receiving a pin 34 on the firebox when the firebox is pivoted as noted hereinbelow.

When, as indicated in FIG. 3, it is desirable to cook beside and not over the fire in the firebox 18, the firebox is pivoted until it assumes an upright position. For the purpose of holding the firebox in an upright position, a suitable latch mechanism 38 is employed. This latch mechanism 38 may comprise an arm 39, one end of which is pivotally secured to the top 2 of the cart 1, and the other end of which is provided with an apertured head 40, which engages the stud pin 41 affixed to a side of the firebox. A plurality of spaced apertures are located in head 40 in order to provide locking of the firebox in an upright position regardless of the particular support brackets 33 on which the firebox is disposed.

When the firebox is disposed in a horizontal position within opening 11, it is supported at both ends by means of pins 34. Positioned below the firebox 18 is an ash clean-out or collection tray 43 which is slidably mounted on the opposing pair of angle brackets or rails 44 and 45, in opening 11, as shown in FIG. 1. A drip tray 4 is disposed below the "Chinese Oven" unit 21.

As indicated particularly in FIG. 4, the firebox 18 may be so constructed that it is provided with a pair of hinged sides 50 and 51. Hinged side 51 is used so that access may be gained to the interior of the firebox for the purpose of supplying fuel when the firebox is in a horizontal position, and side 50 is used when the firebox is disposed in an upright position. Sides 50 and 51 can be provided with handles 52 and any suitable latching clamps 53. Alternately, as indicated in FIG. 9, catches 53' may be employed to hold the hinged side or lid 51 in place. This lid may be used only when the firebox 18 is disposed in the vertical position shown in FIG. 3. In this event, a separate grill (not shown) may be removably mounted over the opening 11. In this case, a removable handle 55 may be provided as shown in FIG. 9, in place of handles 52 to lift the firebox or to open the firebox when it is in either vertical or horizontal position.

A wind break 70 is also advantageously used with opening 11, the wind break being suitably hinged to the top 2. By perforating the end wall 60 of top 2, as shown in FIG. 2, an adequate supply of air to support combustion of the charcoal in the firebox 18 will always be insured. At the same time, the perforated wall will also insure a slow burning of the charcoal.

In a further advantageous embodiment of the invention, means are provided for compacting the fuel space in firebox 18. These means, as indicated in FIG. 4, may comprise a steel strip 65 to which is secured a steel handle 66 and side guides 67. The steel strip or insert 65 acts to shorten the firebox so only a small amount of fuel will be needed to do a correspondingly small amount of cooking.

In the case where "Chinese Oven" unit 21 is employed, the firebox 18 is disposed in a horizontal position and the adjustable damper 95 hinged to the top 2 is opened and held in the proper position by any suitable notched ratchet-type arm 96 which engages the top 2 as diagrammatically shown in FIG. 1. At this time, also, it is to be noted that wind break 70 is moved downwardly so that it closes off opening 11 and thus forces the smoke from firebox 18 underneath top 2, past damper 95, into unit 21, and out through flue 89.

It should be noted that the shaft 14 is not to be placed in the Chinese Oven unit 21 when it is desired to cook on the rack 80. In other words, cooking is ordinarily to be done by one of these means at a time.

An advantageous embodiment of the invention has been shown and described. It will be obvious that various changes may be made therein without departing from the spirit and scope thereof as defined in the appended claims wherein what is claimed is:

1. A portable cooking unit comprising, in combination, a housing having top, side and end walls, first and second openings in said top, communicating with one another through the interior of said housing, a firebox removably mounted in said first opening, a smoke chamber mounted above said second opening, a rotisserie shaft and drive means, means for interchangeably supporting said rotisserie shaft in position above said first opening or within said chamber over said second opening, means for coupling said shaft to said drive means in either of said positions, means for directing smoke from said firebox to said second opening and through said chamber, and a damper between said openings for regulating the passage of said smoke to said chamber.

2. A portable cooking unit as claimed in claim 1, wherein said drive means comprises an electric motor, means directly connecting said motor to said rotisserie shaft, and means supporting said motor for operation of said shaft in either selected position.

References Cited in the file of this patent

UNITED STATES PATENTS

| | | |
|---|---|---|
| 74,228 | Kastendike | Feb. 11, 1868 |
| 1,776,072 | Jordan | Sept. 16, 1930 |
| 2,012,811 | Duffy | Aug. 27, 1935 |
| 2,379,239 | Krebs | June 26, 1945 |
| 2,573,988 | Saltzberg | Nov. 6, 1951 |
| 2,797,633 | Goodwin | July 2, 1957 |
| 2,815,707 | Morrow | Dec. 10, 1957 |
| 2,851,941 | Cogar | Sept. 16, 1958 |
| 2,885,950 | Stoll et al. | May 12, 1959 |
| 2,888,872 | Bathe | June 2, 1959 |
| 2,938,450 | Carpenter et al. | May 31, 1960 |

FOREIGN PATENTS

| | | |
|---|---|---|
| 99,138 | Germany | Sept. 30, 1898 |